US007059029B2

United States Patent
Nathan et al.

(10) Patent No.: US 7,059,029 B2
(45) Date of Patent: Jun. 13, 2006

(54) METHOD OF TESTING A SENSOR ARRAY INCORPORATED INTO A VEHICLE SEAT

(75) Inventors: John F. Nathan, White Lake Township, MI (US); Oliver Young, Grosse Pointe Farms, MI (US)

(73) Assignee: Lear Corporation, Southfield, MI (US)

( * ) Notice: Subject to any disclaimer, the term of this patent is extended or adjusted under 35 U.S.C. 154(b) by 304 days.

(21) Appl. No.: 10/749,162

(22) Filed: Dec. 30, 2003

(65) Prior Publication Data

US 2005/0138784 A1    Jun. 30, 2005

(51) Int. Cl.
*B23Q 17/00* (2006.01)

(52) U.S. Cl. .................... 29/91.1; 29/407.08; 29/448

(58) Field of Classification Search .................... 29/91, 29/91.1, 91.5, 407.01, 407.08, 448
See application file for complete search history.

(56) References Cited

U.S. PATENT DOCUMENTS

| | | |
|---|---|---|
| 5,377,108 A | 12/1994 | Nishio |
| 5,404,128 A | 4/1995 | Ogino et al. |
| 5,413,378 A | 5/1995 | Steffens, Jr. et al. |
| 5,474,327 A | 12/1995 | Schousek |
| 5,485,000 A | 1/1996 | Schneider |
| 5,570,903 A | 11/1996 | Meister et al. |
| 5,583,771 A | 12/1996 | Lynch et al. |
| 5,594,222 A | 1/1997 | Caldwell |
| 5,653,462 A | 8/1997 | Breed et al. |
| 5,684,701 A | 11/1997 | Breed |
| 5,694,320 A | 12/1997 | Breed |
| 5,731,781 A | 3/1998 | Reed |
| 5,739,757 A | 4/1998 | Gioutsos |
| 5,748,473 A | 5/1998 | Breed et al. |
| 5,810,392 A | 9/1998 | Gagnon |
| 5,822,707 A | 10/1998 | Breed et al. |
| 5,829,782 A | 11/1998 | Breed et al. |
| 5,835,613 A | 11/1998 | Breed et al. |
| 5,848,802 A | 12/1998 | Breed et al. |
| 5,877,677 A | 3/1999 | Fleming et al. |
| 5,890,758 A | 4/1999 | Pone et al. |
| 5,901,978 A | 5/1999 | Breed et al. |
| 5,931,254 A | 8/1999 | Loraas et al. |
| 5,931,527 A | 8/1999 | D'Onofrio et al. |
| 5,943,295 A | 8/1999 | Varga et al. |
| 5,954,398 A | 9/1999 | Namba et al. |

(Continued)

FOREIGN PATENT DOCUMENTS

| | | |
|---|---|---|
| EP | 0 689 967 A1 | 3/1996 |
| WO | WO 98/41424 | 3/1997 |

*Primary Examiner*—David P. Bryant
(74) *Attorney, Agent, or Firm*—Bill Panagos

(57) ABSTRACT

The present invention provides a method of testing a sensor array that is incorporated into a vehicle seat. The method includes the steps of placing a seat pan and cushion assembly having a seat trim cover and a sensor array into a seat build fixture and electrically connecting the sensor array to an electrical testing device capable of determining the actuation of the sensors in the sensor array. The method further includes the steps of determining if the sensors are at a predetermined unloaded output value, activating the seat build fixture to apply compression force to the seat pan and cushion assembly, and determining if the sensors have changed output values where the change corresponds to a predetermined amount. The method also includes the steps of mounting the seat trim cover to the bottom of the seat pan in a predetermined manner to form a completed lower seat assembly and de-activating the seat build fixture to release compression force from the completed lower seat assembly.

17 Claims, 4 Drawing Sheets

U.S. PATENT DOCUMENTS

| | | |
|---|---|---|
| 5,971,432 A | 10/1999 | Gagnon et al. |
| 5,975,612 A | 11/1999 | Macey et al. |
| 6,012,007 A | 1/2000 | Fortune et al. |
| 6,020,812 A | 2/2000 | Thompson et al. |
| 6,024,378 A * | 2/2000 | Fu .................... 280/735 |
| 6,027,138 A | 2/2000 | Tanaka et al. |
| 6,030,038 A | 2/2000 | Namba et al. |
| 6,039,139 A | 3/2000 | Breed et al. |
| 6,043,743 A | 3/2000 | Saito et al. |
| 6,045,405 A | 4/2000 | Geltsch et al. |
| 6,056,079 A | 5/2000 | Cech et al. |
| 6,059,358 A | 5/2000 | Demick et al. |
| 6,078,854 A | 6/2000 | Breed et al. |
| 6,079,763 A | 6/2000 | Clemente |
| 6,081,757 A | 6/2000 | Breed et al. |
| 6,088,640 A | 7/2000 | Breed |
| 6,089,641 A | 7/2000 | Mattarella et al. |
| 6,101,436 A | 8/2000 | Fortune et al. |
| 6,102,463 A | 8/2000 | Swanson et al. |
| 6,116,639 A | 9/2000 | Breed et al. |
| 6,129,168 A | 10/2000 | Lotito et al. |
| 6,129,404 A | 10/2000 | Mattarella et al. |
| 6,134,492 A | 10/2000 | Breed et al. |
| 6,138,067 A | 10/2000 | Cobb et al. |
| 6,141,432 A | 10/2000 | Breed et al. |
| 6,168,198 B1 | 1/2001 | Breed et al. |
| 6,186,537 B1 | 2/2001 | Breed et al. |
| 6,220,627 B1 | 4/2001 | Stanley |
| 6,234,519 B1 | 5/2001 | Breed |
| 6,234,520 B1 | 5/2001 | Breed et al. |
| 6,242,701 B1 | 6/2001 | Breed et al. |
| 6,250,671 B1 | 6/2001 | Osmer et al. |
| 6,250,672 B1 | 6/2001 | Ryan et al. |
| 6,253,134 B1 | 6/2001 | Breed et al. |
| RE37,260 E | 7/2001 | Varga et al. |
| 6,254,127 B1 | 7/2001 | Breed et al. |
| 6,270,116 B1 | 8/2001 | Breed et al. |
| 6,279,946 B1 | 8/2001 | Johnson et al. |
| 6,283,503 B1 | 9/2001 | Breed et al. |
| 6,323,444 B1 | 11/2001 | Aoki |
| 6,324,453 B1 | 11/2001 | Breed et al. |
| 6,325,414 B1 | 12/2001 | Breed et al. |
| 6,330,501 B1 | 12/2001 | Breed et al. |
| 6,342,683 B1 | 1/2002 | Aoki et al. |
| 6,353,394 B1 | 3/2002 | Maeda et al. |
| 6,393,133 B1 | 5/2002 | Breed et al. |
| 6,394,490 B1 | 5/2002 | Osmer et al. |
| 6,397,136 B1 | 5/2002 | Breed et al. |
| 6,407,347 B1 | 6/2002 | Blakesley |
| 6,412,813 B1 | 7/2002 | Breed et al. |
| 6,416,080 B1 | 7/2002 | Gillis et al. |
| 6,422,595 B1 | 7/2002 | Breed et al. |
| 6,442,465 B1 | 8/2002 | Breed et al. |
| 6,442,504 B1 | 8/2002 | Breed et al. |
| 6,445,988 B1 | 9/2002 | Breed et al. |
| 6,452,870 B1 | 9/2002 | Breed et al. |
| 6,457,545 B1 | 10/2002 | Michaud et al. |
| 6,474,739 B1 | 11/2002 | Lagerweij |
| 6,476,514 B1 | 11/2002 | Schondorf |
| 6,506,069 B1 | 1/2003 | Babala et al. |
| 6,532,408 B1 | 3/2003 | Breed |
| 6,605,877 B1 | 8/2003 | Patterson et al. |
| 6,609,054 B1 | 8/2003 | Wallace |
| 6,615,122 B1 | 9/2003 | Yamashita |
| 6,825,765 B1 * | 11/2004 | Stanley et al. .............. 340/561 |
| 2002/0003345 A1 | 1/2002 | Stanley et al. |
| 2002/0056975 A1 | 5/2002 | Yoon et al. |
| 2002/0079728 A1 | 6/2002 | Tame |
| 2002/0098730 A1 | 7/2002 | Babala et al. |
| 2002/0195807 A1 | 12/2002 | Ishida |
| 2003/0040858 A1 | 2/2003 | Wallace |
| 2003/0071479 A1 | 4/2003 | Schaller et al. |
| 2003/0090133 A1 | 5/2003 | Nathan et al. |
| 2003/0106723 A1 | 6/2003 | Thakur et al. |
| 2003/0111276 A1 | 6/2003 | Kajiyama |
| 2003/0164715 A1 | 9/2003 | Lester |
| 2003/0171036 A1 | 9/2003 | Aujla et al. |
| 2003/0189362 A1 | 10/2003 | Lichtinger et al. |
| 2003/0196495 A1 | 10/2003 | Saunders et al. |
| 2003/0220766 A1 | 11/2003 | Saunders et al. |
| 2004/0117141 A1* | 6/2004 | Giesel et al. ............... 702/104 |
| 2005/0056104 A1* | 3/2005 | David et al. ............... 73/865.3 |
| 2005/0091817 A1* | 5/2005 | Eger et al. ............... 29/407.07 |

* cited by examiner

METHOD OF TESTING A SENSOR ARRAY INCORPORATED INTO A VEHICLE SEAT

BACKGROUND OF THE INVENTION

1. Field of the Invention

The present invention relates, generally to a method of testing a sensor array incorporated into a vehicle seat and, more specifically, to a method of testing a sensor array incorporated into a vehicle seat while the seat is under construction in a seat build compression fixture.

2. Description of the Related Art

Automotive vehicles employ seating systems that accommodate the passengers of the vehicle. The seating systems include restraint systems that are calculated to restrain and protect the occupants in the event of a collision. The primary restraint system commonly employed in most vehicles today is the seatbelt. Seatbelts usually include a lap belt and a shoulder belt that extends diagonally across the occupant's torso from one end of the lap belt to a mounting structure located proximate to the occupant's opposite shoulder.

In addition, automotive vehicles may include supplemental restraint systems. The most common supplemental restraint system employed in automotive vehicles today is the inflatable airbag. In the event of a collision, the airbags are deployed as an additional means of restraining and protecting the occupants of the vehicle. Originally, the supplemental inflatable restraints (airbags) were deployed in the event of a collision whether or not any given seat was occupied. These supplemental inflatable restraints and their associated deployment systems are expensive and over time this deployment strategy was deemed not to be cost effective. Thus, there became a recognized need in the art for a means to selectively control the deployment of the airbags such that deployment occurs only when the seat is occupied.

Partially in response to this need, vehicle safety systems have been proposed that include vehicle occupant sensing systems capable of detecting whether or not a given seat is occupied. The systems act as a switch in controlling the deployment of a corresponding air bag. As such, if the occupant sensing device detects that a seat is unoccupied during a collision, it can prevent the corresponding air bag from deploying, thereby saving the vehicle owner the unnecessary cost of replacing the expended air bag.

Furthermore, many airbag deployment forces and speeds have generally been optimized to restrain one hundred eighty pound males because the one hundred eighty pound male represents the mean average for all types of vehicle occupants. However, the airbag deployment force and speed required to restrain a one hundred eighty pound male exceeds that which are required to restrain smaller occupants, such as some females and small children. Thus, there became a recognized need in the art for occupant sensing systems that could be used to selectively control the deployment of the airbags when a person below a predetermined weight occupies the seat.

Accordingly, other vehicle safety systems have been proposed that are capable of detecting the weight of an occupant. In one such air bag system, if the occupant's weight falls below a predetermined level, then the system can suppress the inflation of the air bag or will prevent the air bag from deploying at all. This reduces the risk of injury that the inflating air bag could otherwise cause to the smaller-sized occupant.

Also, many airbag deployment forces and speeds have generally been optimized to restrain a person sitting generally upright towards the back of the seat. However, the airbag deployment force and speed may inappropriately restrain a person sitting otherwise. Thus, there became a recognized need in the art for a way to selectively control the deployment of an airbag depending on the occupant's sitting position.

Partially in response to this need, other vehicle safety systems have been proposed that are capable of detecting the position of an occupant within a seat. For example, if the system detects that the occupant is positioned toward the front of the seat, the system will suppress the inflation of the air bag or will prevent the air bag from deploying at all. This reduces the risk of injury that the inflating air bag could otherwise cause to the occupant. It can be appreciated that these occupant sensing systems provide valuable data, allowing the vehicle safety systems to function more effectively to reduce injuries to vehicle occupants.

One necessary component of each of the known systems discussed above includes some means for sensing the presence of the vehicle occupant in the seat. One such means may include a sensor device supported within the lower seat cushion of the vehicle seat. For example, U.S. published patent application having U.S. Ser. No. 10/249,527 and Publication No. U.S.2003/0196495 A1 filed in the name of Saunders et al. discloses a method and apparatus for sensing seat occupancy including a sensor/emitter pair that is supported within a preassembled one-piece cylinder-shaped housing. The housing is adapted to be mounted within a hole formed in the seat cushion and extending from the B-surface toward the A-surface of the seat cushion. The sensor/emitter pair supported in the housing includes an emitter that is mounted within the seat cushion and spaced below the upper or A-surface of the seat cushion. In addition, the sensor is also supported by the housing within the seat cushion but spaced below the emitter. The cylindrical housing is formed of a compressible, rubber-like material that is responsive to loads placed on the upper surface of the seat cushion. The housing compresses in response to a load on the seat cushion. The load is detected through movement of the emitter toward the sensor as the housing is compressed. The housing is sufficiently resilient to restore the emitter to full height when no load is applied to the upper surface of the seat cushion. The Saunders et al. system also includes a processor for receiving the sensor signals and interpreting the signals to produce an output to indicate the presence of an occupant in the seat.

Generally speaking, to perform pattern recognition and classification of a physical presence that occupies a vehicle seat, the sensors are arranged into a grid, or an array so that the sensors are collectively used to provide the raw input data as a depression pattern. In this manner, systems of the type known in the related art take the data taken from the sensor array and process it, by a number of different means, in an attempt to determine the physical presence in the seat. The means used by the prior art methods vary from the use of simple computational methods to sophisticated, artificial neural networks. However, regardless of the types of sensors or the types of data processing employed, in each of these prior art vehicle seating occupancy sensing systems the sensor array or gird is integrated into the lower seat assembly as it is constructed.

It is important to note that, given this manner of seat construction, the prior art systems fully complete the assembly of the seat so that is it ready to install in a vehicle or ship to an assembly plant before performing final testing of the sensor array. In some instances, the seats are not tested until installed into the vehicle. This means that if it is not discovered that a particular sensor array is functioning improperly until after the seat is fully built, then the entire seat must be torn apart, the array replaced, the lower seat assembly rebuilt, and the remainder of the seat then reconstructed. In this event, the seat is fully built twice. This is a shortcoming in the construction methods of conventional vehicle seats that are used in known occupancy sensing systems.

While it is known to test the sensor arrays as they are constructed, this testing is generally done by the array manufacturer and is far removed from the ultimate installation of an array into a lower seat assembly and the final assembly of the seat. With conventional seat assembly methods, by the time the vehicle seat is completely built, the integrated sensor array has been subject to a wide variety of physical handling and manipulation from its point of assembly to its incorporation into the lower seat assembly. Thus, for every vehicle seat brought to full construction and then found to have a defective sensor array, correction of the problem is extremely time consuming and wasteful. This is especially true when the vehicle seat is first sent to the vehicle assembly plant before it is tested.

Accordingly, there remains a need in the art for a method of testing the sensor array of a vehicle seat used in an occupancy sensing system during the construction of the seat so that a defective sensor array may be replaced before the seat is fully constructed. Additionally, there is a need to test the seat in several phases of its construction so that the output of the sensor array can be monitored as the lower seat assembly is built around the array.

SUMMARY OF THE INVENTION

The disadvantages of the related art are overcome by the method of the present invention for testing a sensor array that is incorporated into a vehicle seat. The method includes the steps of placing a seat pan and cushion assembly having a seat trim cover and a sensor array into a seat build fixture and electrically connecting the sensor array to an electrical testing device capable of determining the actuation of the sensors in the sensor array. The method steps also include determining if the sensors are at a predetermined unloaded output value, activating the seat build fixture to apply compression force to the seat pan and cushion assembly, and determining if the sensors have changed output values where the change corresponds to a predetermined amount. The method further includes the steps of mounting the seat trim cover to the bottom of the seat pan in a predetermined manner to form a completed lower seat assembly and de-activating the seat build fixture to release compression force from the completed lower seat assembly.

Thus, by testing the sensor array during the construction of the lower seat assembly using the method of the present invention, a faulty sensor array will be immediately identified before any further seat construction takes place. In this way, any teardown of the lower seat assembly to replace the array is minimized and can occur while the seat is at the assembly fixture, if necessary. Accordingly, the present invention overcomes the limitations of the current methods of by providing a testing method for a sensor array in a vehicle seat occupancy sensing system that allows the array to be tested during construction of the seat.

Other objects, features and advantages of the present invention will be readily appreciated as the same becomes better understood after reading the subsequent description taken in connection with the accompanying drawings.

DETAILED DESCRIPTION OF THE PREFERRED EMBODIMENT(S)

Figure 1:
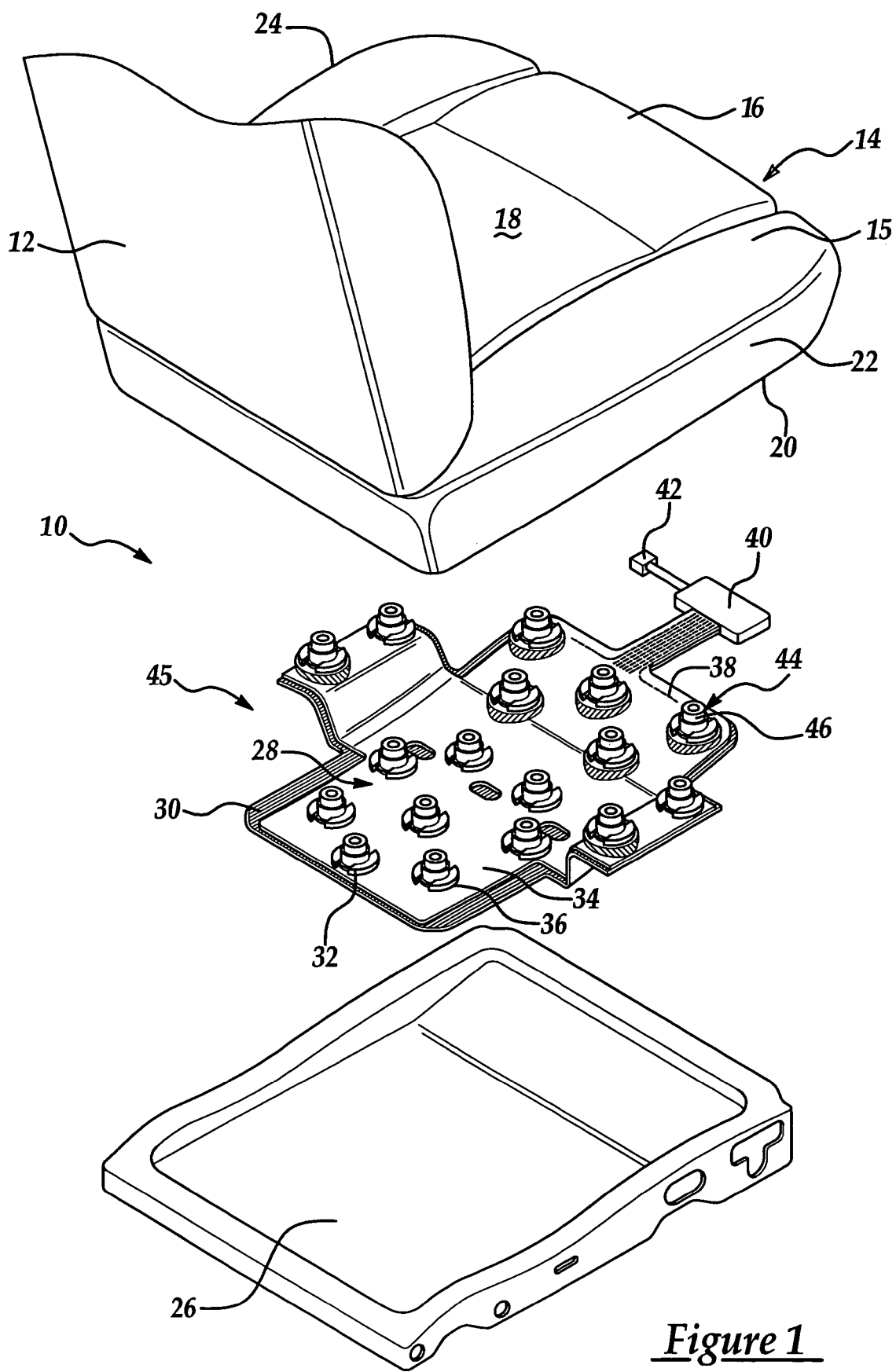
FIG. 1 is an exploded view of a vehicle seat having a sensor array of the type that may be tested by the method of the present invention.

Referring now to the drawings, where like numerals are used to designate like structure throughout the figures, an exploded view of one example of a vehicle seat assembly having an occupancy sensing system that may be employed with the method of the present invention is generally indicated at 10 in FIG. 1. The vehicle seat assembly 10 includes a seat back, generally indicated at 12, and a lower seat assembly, generally indicated at 14. The lower seat assembly 14 has a seat cushion 16 that is enclosed with in a seat trim cover 15. The seat cushion 16 defines an upper surface 18, and a lower surface 20 that is spaced from the upper surface 18. The upper surface 18 of the seat cushion 16 may be referred to as the "A-surface" and the lower surface 20 may be referred to as the "B-surface." The seat cushion 16 also defines an inboard side 22 and an outboard side 24. When an occupant (not shown) is supported on the lower seat assembly 14, the weight of the occupant will apply an axial load directed generally through the upper surface 18 of the seat cushion 16 toward the lower surface 20. Although the weight of the occupant will induce an axial as well as shear forces in the seat cushion 16, those having ordinary skill in the art will recognize that the primary load path of the occupant's weight will be substantially vertical from the upper surface 18 toward the lower surface 20, through the seat cushion 16.

The lower seat assembly 14 also includes a seat pan, generally indicated at 26. The seat pan 26 is generally disposed beneath the lower surface 18 so as to support the seat cushion 16. In turn, the seat pan 26 is operatively supported relative to the floor of the vehicle using any suitable structure of the type commonly known in the art, such as a seat track (not shown). In addition, the vehicle seat assembly 10 includes a vehicle occupant sensing system, generally indicated at 28. The vehicle occupant sensing system 28 is used for detecting a condition of the vehicle seat assembly 10, such as whether or not the vehicle seat assembly 10 is occupied, the size and weight classification of the occupant, or whether the occupant is sitting in a certain position.

The occupant sensing system 28 includes a circuit carrier tray, generally indicated at 30, that is supported by the seat pan 26. The circuit carrier tray 30 includes a plurality of resilient attachment tabs 32 extending upward toward the lower surface 20 of the lower seat cushion 16. Each attachment tab 32 is shaped like a partial ring that extends upward from the tray 30. In the preferred embodiment illustrated in FIG. 1, the attachment tabs 32 are arranged into mirror-image pairs spaced intermittently about the tray 30. The tray 30 supports components of the vehicle occupant sensing system 28 as will be described in greater detail below.

The occupant sensing system 28 also includes a circuit carrier 34, which is disposed adjacent the lower surface 20 of the seat cushion 16. The tray 30 supports the circuit carrier 34, and the circuit carrier 34 includes a plurality of cutouts 36 each having a shape corresponding to the shape of the attachment tabs 32 of the tray 30 such that the tabs 32 can extend upward through the circuit carrier 34.

The occupant sensing system 28 includes a circuit carrier tray, generally indicated at 30, that is supported by the seat pan 26. The circuit carrier tray 30 includes a plurality of resilient attachment tabs 32 extending upward toward the lower surface 20 of the lower seat cushion 16. Each attachment tab 32 is shaped like a partial ring that extends upward from the tray 30. In the preferred embodiment illustrated in FIG. 1, the attachment tabs 32 are arranged into mirror-image pairs spaced intermittently about the tray 30. The tray 30 supports components of the vehicle occupant sensing system 28 as will be described in greater detail below.

The occupant sensing system 28 also includes a circuit carrier 34, which is disposed adjacent the lower surface 20 of the seat cushion 16. The tray 30 supports the circuit carrier 34, and the circuit carrier 34 includes a plurality of cutouts 36 each having a shape corresponding to the shape of the attachment tabs 32 of the tray 30 such that the tabs 32 can extend upward through the circuit carrier 34.

The occupant sensing system 28 also includes an electric circuit 38, which is supported by the circuit carrier 34. Specifically, the circuit carrier 34 is made of a thin nonconductive and corrosion-resistant material, and it encapsulates known electrical components that form the electric circuit 38. For instance, in one embodiment, a flexible printed circuit forms the circuit carrier 34 and electric circuit 38. The circuit 38 is electrically connected to a controller schematically illustrated at 40. The electric circuit 38 carries electric signals generated by the vehicle occupant sensing system 28 to the controller 40. The controller 40 is electrically attached to a restraint system, schematically illustrated at 42. The restraint system 42 can be of many types, such as an air bag system, and the controller 40 controls the restraint system 42 based on the signals delivered by the electric circuit 38. Although an airbag restraint system is discussed here, one having ordinary skill in the art will recognize that the type of restraint system 42 connected to the controller 40 does not limit the scope of the method of the present invention.

The occupant sensing system 28 shown in this example also includes a plurality of sensor assemblies generally indicated at 44 that are supported by the tray 30, below the lower surface 20 of the seat cushion 16. This plurality of sensor assemblies 44 collectively define a sensor array that is generally indicated at 45. As will be discussed in greater detail below, the particular sensor assemblies 44 shown herein have a relatively low profile and can collapse in a more compact manner than similar sensor assemblies of the prior art. Advantageously, these low profile sensor assemblies 44 allow an occupant to sit more comfortably upon the vehicle seat 10.

Figure 2:
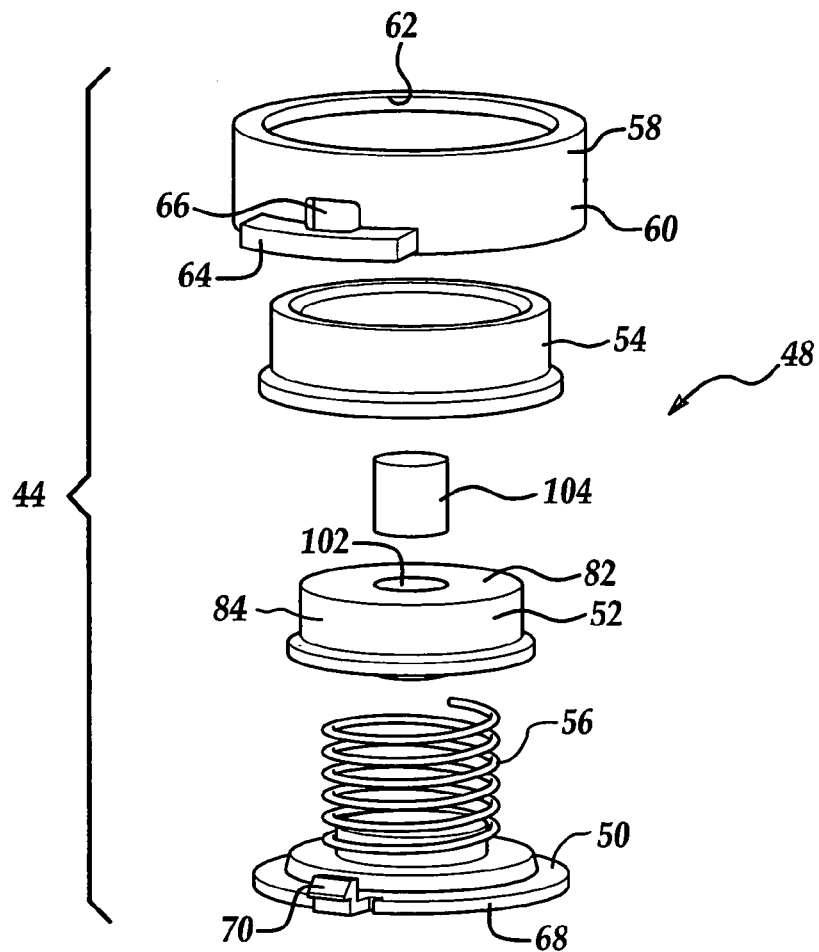
FIG. 2 is an exploded view of a sensor of the type that may be employed with the sensor array of FIG. 1 and tested by the method of the present invention.

A sensor, generally indicated at 46, is operatively fixed relative to each of the low profile sensor assemblies 32. The sensor 46 is in electrical communication with the electric circuit 38. One example of a low profile sensor assembly that may be employed with the method of the present invention is shown in greater detail in FIGS. 2 and 3. The low profile sensor assembly 44 generally includes a housing 48, having a base 50, an upper slide member 52, an intermediate guide member 54, and a base guide 58. The intermediate guide member 54 is disposed between the upper slide member 52 and the base 50. The upper slide member 52 and the intermediate guide member 54 are both supported for movement toward and away from the base 50. A biasing member 56 acts to bias the upper slide member 52 and intermediate guide member 54 away from the base 50.

The base guide 58 is shaped like a hollow tube so as to define a wall 60 with a bore 62 extending axially therethrough to allow for axial movement of the intermediate guide member 54. The base 50 also includes a retainer portion 68, which is substantially disc-shaped and is attached to one terminal end of the base guide 58. Two resilient tabs 70 extend radially and upward from an outer circumferential edge of the retainer portion 68. The tabs 70 are spaced 180° apart from each other. To connect the retainer portion 68 and the base guide 58, the retainer 68 moves axially into the bore 62 of the base guide 58 such that the tabs 70 of the retainer 68 snap into the apertures 66 of the base guide 58.

Figure 3:
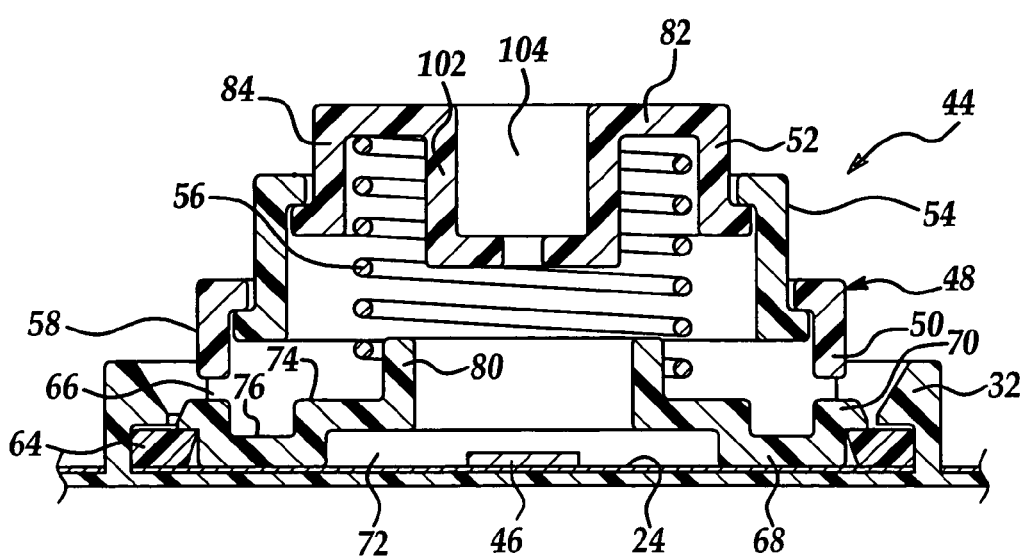
FIG. 3 is a cross-sectional view of the sensor of FIG. 2 that maybe employed with the sensor array of FIG. 1 and tested by the method of the present invention.

The upper slide member 52 includes an upper disc portion 82 and a support wall 84 extending axially downward from the outer circumference of the upper disc portion 82. The support wall 84 has a smaller diameter than the diameter of the intermediate guide member 54 such that the upper slide member 52 can move axially through the intermediate guide member 54. The biasing member 56 is disposed between the inner platform 78 of the base 50 and the upper disc portion 82 of the upper slide member 52. As shown in FIG. 3, the base 50 can be attached to the annular attachment tabs 32 that extend upwardly from the tray 30. Specifically, the hold-down flanges 64 of the base guide 58 can be positioned under the annular attachment tabs 32 of the tray 30 such that the annular attachment tabs 32 retain the hold-down flanges 64. To attach the base 50 to the tray 30, the bottom surface of the base 50 is positioned on the tray 30 such that the hold-down flanges 64 and the annular attachment tabs 32 are not aligned. Then, the base 50 is rotated about its axis until the hold-down flanges 64 move completely under the annular attachment tabs 32.

An annular void 72 is formed near the axial center of the base 50. As shown in FIG. 3, the sensor 46 is a Hall effect sensor attached to the circuit carrier 34 between each pair of tabs 32 of the tray 30. The upper disc portion 82 of the upper slide member 52 includes a retainer portion 102 that accepts and retains an emitter 104, such as a magnet. The magnet thereby moves in axial relationship to the sensor 46 that is disposed upon and in electrical communication with the electric circuit 38. Thus, the weight of an occupant will deform the seat cushion 16 such that the lower surface 20 of the lower seat cushion 16 pushes the upper slide member 52 toward the base 50. As the upper slide member 52 moves, the sensor 46 detects an increase in magnetic flux density generated by the approaching emitter 104. In this way, the sensor 46 is operable to detect movement of the upper slide member 52 toward and away from the base 50. In turn, the sensor 46 generates a responsive signal indicative of the increase in flux density, and the controller 40 controls the restraint system 42 based on these signals. The example of a sensor assembly 44 is described in greater detail in a co-pending application, Ser. No. 11/139,722, entitled "Vehicle Occupant Sensing System Having A Low Profile Sensor Assembly," which is hereby incorporated in its entirety by reference. The electrical attachment between the sensor 46 and the circuit carrier 34 can be accomplished in the manner described in a co-pending application, Ser. No.

10/748,514, entitled "Vehicle Occupant Sensing System and Method of Electrically Attaching a Sensor to an Electrical Circuit," which is hereby incorporated in its entirety by reference.

In this manner, the sensor array assembly 45, through the combined output of the sensors 46 forms a portion of a vehicle seat occupancy sensing system that is associated with the supplemental restrain system (SRS) 42. The sensor array 45 is utilized to provide data to the control system of the SRS. The SRS control system may employ a neural net (NN). In this case, the control system uses the pattern generated by the sensor array 45, based on the occupancy of the vehicle seats as recognized by the NN, to activate or suppress the deployment of the airbags. More specifically, when a physical presence occupies the vehicle seat, the collective sensor outputs of the sensors 46 in the sensor array 45 produce a particular pattern that the NN recognizes as belonging to a certain group of patterns (i.e. a cluster or classification). If the pattern is one that falls into a classification that it has been predetermined that it is desirable to deploy the airbag in the event of an impact, the SRS control system will be prepared to do so. If the pattern is one that falls into a classification that it has been predetermined that it is not desirable to deploy the airbag in the event of an impact, the SRS control system will take steps to suppress the deployment. Furthermore, the classification of the recognized pattern also provides the SRS control system with the capability to control the rate and percentage of airbag deployment if the SRS system is so designed.

Figure 4:
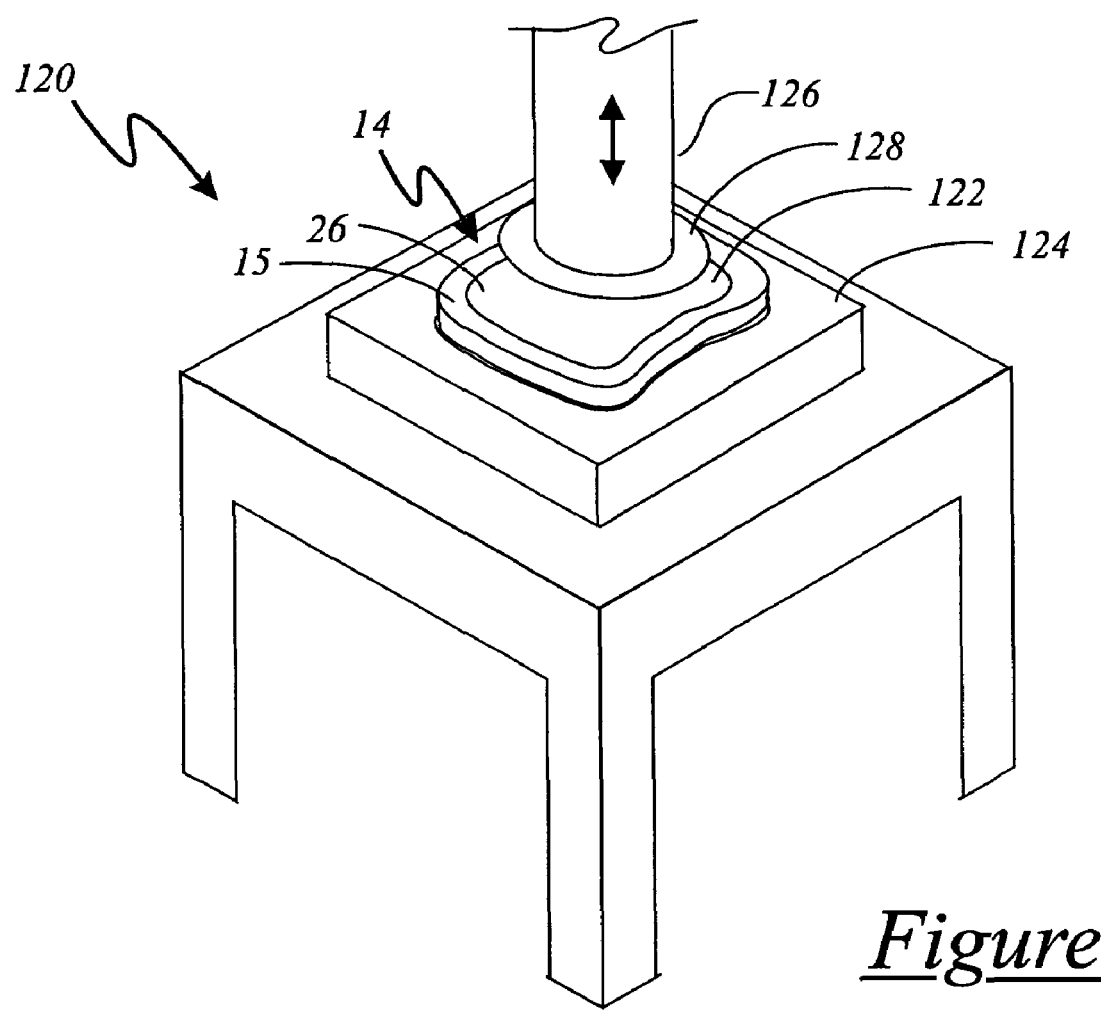
FIG. 4 is an schematic illustration of a typical seat build fixture for the construction of a vehicle lower seat assembly.

As schematically illustrated in FIG. 4, a representation of a typical seat build fixture which may be employed with the method of the present invention to test the sensor array 45 as the lower seat assembly 14 is being constructed is generally indicated at 120. The seat build fixture 120 is used to hold and compress the components of a lower seat assembly 14 so that the seat trim cover 15 can be stretched over the foam cushion material 16 and physically attached to the bottom surface 122 of the seat pan 26. The seat build fixture 120 includes a negative form 124, which is of the general shape of the lower seat assembly 14 in its completed size and shape. The seat build fixture 120 also includes a ram assembly 126 having a compression plate 128. It should be appreciated that the ram assembly may be hydraulically or mechanically actuated to provide a downward controllable force, as illustrated in FIG. 4, to compress the elements of the lower seat assembly together in the form 124. It should be further appreciated that the compression plate 128 may have an operative shape to interact with the bottom surface 122 (when assembled) of the seat pan 26.

Figure 5:
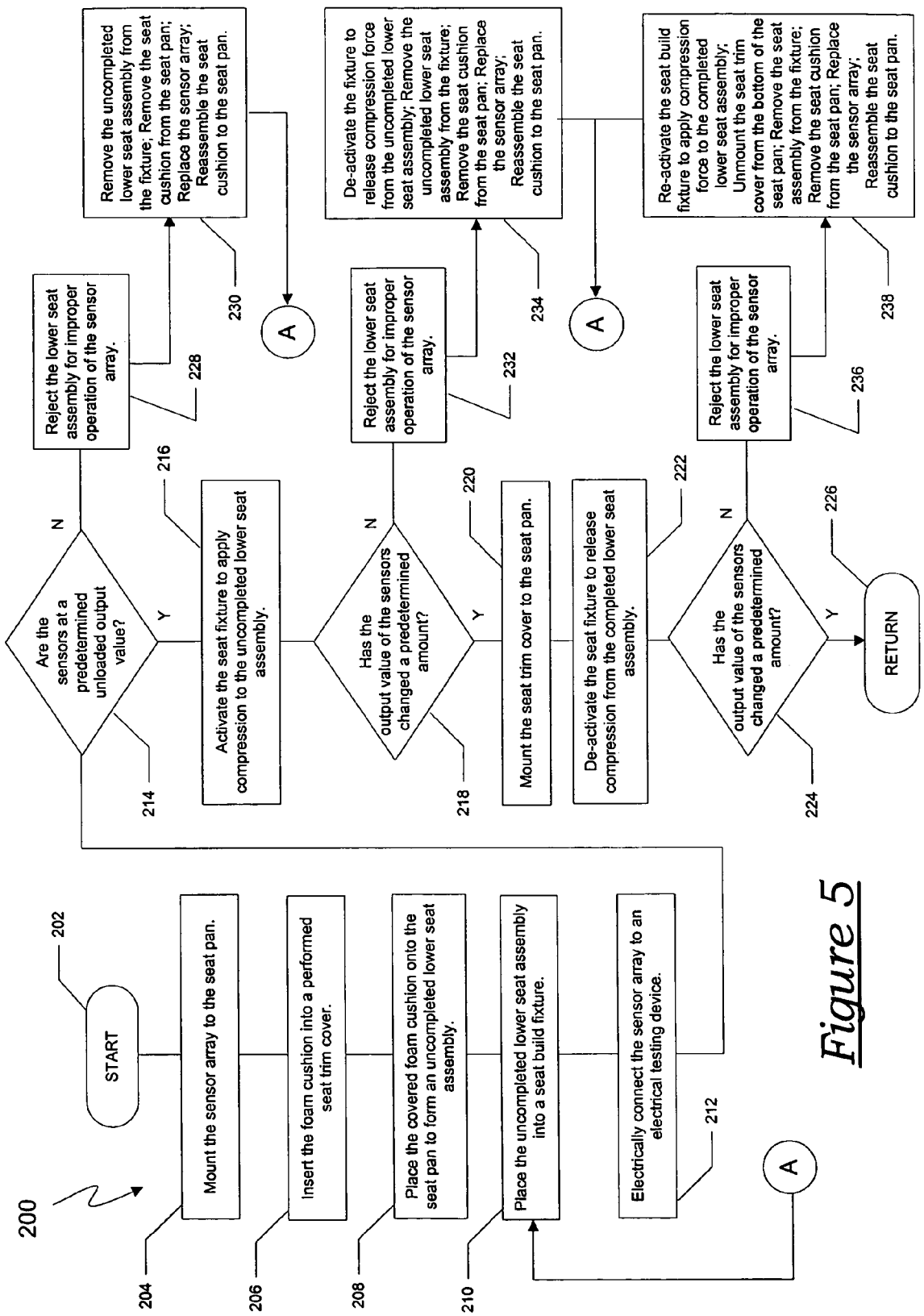
FIG. 5 is a block diagram flowchart of the method of the present invention for providing a testing method for a sensor array in a vehicle seat occupancy sensing system that allows the array to be tested during construction of the seat.

The method of the present invention is used to test the sensor array 45 during the construction of the lower seat assembly 14, is generally indicated at 200 in FIG. 5. The method is initiated at the start entry block 202. As shown in FIG. 1, with regard to process block 204 of FIG. 5, in preparation of utilizing the seat build fixture 120, the sensor array 45 is mounted to the seat pan 26. More specifically, for the example of the occupancy sensing system 28 described above and shown in FIG. 1, the sensor array 45 is first mounted to the circuit carrier tray 30 and the tray is then mounted to the seat pan 26. Process block 206 then continues with the foam seat cushion 16 being inserted into the preformed seat trim cover 15. Then, process block 208 provides that the covered foam cushion is placed over the seat pan 26 and sensor array 45. Process block 210 then calls for the trim cover 15 to be placed over the combined seat pan 26 and seat cushion 16 assembly to form the uncompleted lower seat assembly 14. The uncompleted lower seat assembly 14 is then invertedly placed in the seat build fixture 120 as illustrated in FIG. 4.

It should be appreciated that the order of the preparatory steps is not critical to the method of the present invention. For example, the foam seat cushion 16 may be first placed on the seat pan 26 and sensor array 45 before the trim cover 15 is applied or the covered foam cushion may be placed in the seat build fixture 120 first and then the seat pan 26 with the sensor array 45 placed on top. In the example of the seat build fixture 120 shown in FIG. 4, the above-mentioned components of the lower seat assembly 14 are placed in the seat build fixture 120 in an inverted manner. This allows the seat builder to draw the trim cover 15 tightly up over the seat pan 26 so that the cover can be attached to the seat pan 26 under compression in the fixture. It should be appreciated that other seat build fixtures that do not invert the lower seat assembly for assembly may also be employed with this method.

Process block 212 then provides the step of electrically connecting the sensor array to an electrical testing device that is capable of determining the actuation of the sensors 46 in the sensor array 45 while the lower seat assembly 14 is in the seat build fixture 120. It should be appreciated that the example of the seat build fixture 120 shown in FIG. 4 provides the necessary access to connect the sensor array 45 to such an electrical testing device and that this device may or may not be physically a part of the seat build fixture itself. Furthermore, the electrical testing device may be nothing more than a measuring device to electrically note the changes in the deflection of the sensors (e.g. an ohmmeter) or it may be a more sophisticated device capable of supplying any needed signals or voltages necessary depending on the structure of the sensors themselves.

Regardless, decision block 214 (FIG. 5) then determines if the sensors 46 are at a predetermined unloaded output value. This determination is indicative of a sensor array in which the sensors are properly functional and not inadvertently held in a state of deflection. If any of the sensors are not at the predetermined unloaded valve, the "No" path is taken to process block 228 in which the uncompleted lower seat assembly 14 is rejected for the improper operation of the sensor array 45. Process block 230 then allows correction of this problem, by further including the steps of: removing the uncompleted lower seat assembly 14 from the seat build fixture 120, removing the seat cushion 16 from the seat pan 26, replacing the sensor array 45, and reassembling the seat cushion 16 to the seat pan 26. As further shown in FIG. 5, the method steps continue by moving to connection point "A" in which the uncompleted lower seat assembly 14 is returned to the seat build fixture 120 to be retested. It should be appreciated that process block 230 and connection point "A" may represent an immediate teardown, rebuild, and return of the lower seat assembly 14 to the seat build fixture 120, or may also represent separate stages in which rejected lower seat assemblies 14 are separately dealt with to avoid slowing or halting an on-going assembly line build-up of lower seat assemblies.

If the output of the sensors at decision block 214 are at the predetermined unloaded value, the "Yes" path is followed to process block 216 in which the seat builder will activate the seat build fixture 120 to apply compression force to the uncompleted lower seat assembly 14. Decision block 218 then determines if the sensors 46 have changed output values where the change corresponds to a predetermined amount. This determination is indicative of a sensor array 45 in which the sensors 46 are properly responsive to a compressive loading of the uncompleted lower seat assembly 14. The predetermined amount is used to determine if the sensors 46 deflect to an expected level given the known compression across the entire lower seat assembly 14.

If the output value of the sensors 46 has not changed the predetermined amount, the "No" path is taken to process block 232 in which the uncompleted lower seat assembly 14 is rejected for the improper operation of the sensor array 45. Process block 234 then allows correction of this problem, by further including the steps of: de-activating the seat build fixture 120 to release the compression force, removing the uncompleted lower seat assembly 14 from the seat build fixture 120, removing the seat cushion 16 from the seat pan 26, replacing the sensor array 45, and reassembling the seat cushion 16 to the seat pan 26. As shown in FIG. 5, the method steps continue by moving to connection point "A" in which the uncompleted lower seat assembly 14 is returned to the seat build fixture 120 to be retested. It should be appreciated that process block 234 and connection point "A" may represent an immediate teardown, rebuild, and return of the lower seat assembly 14 to the seat build fixture 120, or may also represent separate stages in which rejected lower seat assemblies 14 are separately dealt with to avoid slowing or halting an on-going assembly line build-up of lower seat assemblies.

If the output of the sensors at decision block 218 have changed to the predetermined amount, the "Yes" path is followed to process block 220 in which the seat builder will mount the seat trim cover 15 to the bottom of the seat pan 26 in a predetermined manner to complete the construction of the lower seat assembly 14. It should be appreciated that the mounting of the seat trim cover 15 to the bottom of the seat pan 26 in process block 220 further includes the steps of first stretching the ends of the seat trim cover 15 around the underside of the seat pan 26, and then attaching the seat trim cover 15 to the seat pan 26. In the preferred embodiment, the trim cover 15 is attached by using a plurality of mechanical connectors. However, any of a variety of known attachment methods could also be employed.

Then, in process block 222 the seat builder will de-activate the seat build fixture 120 to release the compression force from the completed lower seat assembly 14. Decision block 224 then determines if the sensors 46 have again changed output values to where the change corresponds to another predetermined amount. This determination is indicative of a sensor array 45 in which the sensors 46 properly respond to a compressive unloading of the completed lower seat assembly 14 and will return to an empty seat position. If the output value of the sensors 46 has not changed the predetermined amount that represents an empty seat, the "No" path is taken to process block 236 in which the completed lower seat assembly 14 is rejected for the improper operation of the sensor array 45. Process block 238 then allows correction of this problem, by further including the steps of: re-activating the seat build fixture 120 to apply compression force to the completed lower seat assembly 14, unmounting the seat trim cover 15 from the bottom of the seat pan 26, de-activating the seat build fixture 120 to release the compression force, removing the lower seat assembly 14 from the fixture, removing the seat cushion 16 from the seat pan 26, replacing the sensor array 45, and reassembling the seat cushion 16 to the seat pan 26. As shown in FIG. 5, the method steps continue by moving to connection point "A" in which the uncompleted lower seat assembly 14 is returned to the seat build fixture 120 to be retested. It should be appreciated that process block 238 and connection point "A" may represent an immediate teardown, rebuild, and return of the lower seat assembly 14 to the seat build fixture 120, or may also represent separate stages in which rejected lower seat assemblies 14 are separately dealt with to avoid slowing or halting an on-going assembly line build-up of lower seat assemblies.

If the output of the sensors 46 at decision block 224 have changed to the predetermined amount, the "Yes" path is followed to the return end block 226. At this point, the lower seat assembly 14 is complete and the sensor array 45 has shown proper test responses. Thus, the return end block 226 represents removal of the completed lower seat assembly 14 from the seat build fixture 120 for further assembly of the entire seat in another process and a return to the start entry block 202 to begin the process for the next lower seat assembly 14 to be built.

In this manner, a lower seat assembly having a sensor array in conjunction with an occupancy sensing system is produced and the proper operation of the array is insured prior to the full completion of the vehicle seat. Thus, the method of the present invention overcomes the drawbacks and the limitations of the prior art by providing a testing method for a sensor array that is incorporated into the vehicle seat. The method avoids costly rejection and rebuilding of the entire seat experienced with prior art methods by providing testing steps during the seat construction process. Further, the method of the present invention tests the sensor array during the phases of the construction of the lower seat assembly so that the output of the sensor array can be monitored as the lower seat assembly is placed in the seat build fixture, compressed, and completed.

The invention has been described in an illustrative manner. It is to be understood that the terminology which has been used is intended to be in the nature of words of description rather than of limitation. Many modifications and variations of the invention are possible in light of the above teachings. Therefore, within the scope of the claims, the invention may be practiced other than as specifically described.

We claim:

1. A method of testing a sensor array incorporated into a vehicle seat, said method including the steps of:
    placing a seat pan and cushion assembly having a seat trim cover and a sensor array into a seat build fixture;
    electrically connecting the sensor array to an electrical testing device capable of determining the actuation of the sensors in the sensor array;
    determining if the sensors are at a predetermined unloaded output value;
    activating the seat build fixture to apply compression force to the seat pan and cushion assembly;
    determining if the sensors have changed output values where the change corresponds to a predetermined amount;
    mounting the seat trim cover to the bottom of the seat pan in a predetermined manner to form a completed lower seat assembly; and
    de-activating the seat build fixture to release compression force from the completed lower seat assembly.

2. A method as set forth in claim 1 wherein the step of determining if the sensors are at a predetermined unloaded output value further includes the step of rejecting the uncompleted lower seat assembly if any sensor is not at the predetermined unloaded value.

3. A method as set forth in claim 2 wherein the step of rejecting the uncompleted lower seat assembly if any sensor is not at the predetermined unloaded value further includes the steps of:

removing the uncompleted lower seat assembly from the fixture;
removing the seat cushion from the seat pan;
replacing the sensor array;
reassembling the seat cushion to the seat pan; and
returning the uncompleted lower seat assembly to the seat fixture to be retested.

4. A method as set forth in claim 1 wherein the step of determining if the sensors have changed output values where the change corresponds to a predetermined amount when the seat build fixture is activated further includes the step of rejecting the uncompleted lower seat assembly if any sensor did not change its output value to the predetermined amount.

5. A method as set forth in claim 4 wherein the step of rejecting the uncompleted lower seat assembly if any sensor did not change its output value to the predetermined amount further includes the steps of:
de-activating the seat build fixture to release the compression force from the uncompleted lower seat assembly;
removing the uncompleted lower seat assembly from the fixture;
removing the seat cushion from the seat pan;
replacing the sensor array;
reassembling the seat cushion to the seat pan; and
returning the uncompleted lower seat assembly to the seat fixture to be retested.

6. A method as set forth in claim 1 wherein the step of de-activating the seat build fixture to release compression force from completed lower seat assembly further includes the steps of:
determining if the sensors have changed output values where the change corresponds to a predetermined amount; and
rejecting the completed lower seat assembly if any sensor did not change its output value to the predetermined amount.

7. A method as set forth in claim 6 wherein the step of rejecting the completed lower seat assembly if any sensor did not change its output value to the predetermined amount when the seat build fixture is de-activated further includes the steps of:
re-activating the seat build fixture to apply compression force to the completed lower seat assembly;
unmounting the seat trim cover from the bottom of the seat pan;
de-activating the seat build fixture to release the compression force;
removing the lower seat assembly from the fixture;
removing the seat cushion from the seat pan;
replacing the sensor array;
reassembling the seat cushion to the seat pan; and
returning the seat pan and cushion assembly to the seat fixture to be retested.

8. A method as set forth in claim 1 wherein the step of placing a seat pan and cushion assembly having a sensor array into a seat build fixture further includes the steps of first:
mounting a sensor array to a seat pan;
inserting a foam cushion into a preformed seat trim cover; and
placing the covered foam cushion onto the seat pan to form an uncompleted lower seat assembly.

9. A method as set forth in claim 1 wherein the step of mounting the seat trim cover to the bottom of the seat pan in a predetermined manner to complete the construction of the lower seat assembly further includes the step of first stretching the ends of the seat trim cover around the underside of the seat pan while the seat pan and cushion assembly are in compression.

10. A method as set forth in claim 9 wherein the step of mounting the seat trim cover to the bottom of the seat pan in a predetermined manner to complete the construction of the lower seat assembly further includes the step of attaching the seat trim cover to the seat pan by using a plurality of mechanical connectors.

11. A method of testing a sensor array incorporated into a vehicle seat, said method including the steps of:
mounting a sensor array to a seat pan;
inserting a foam cushion into a preformed seat trim cover;
placing the covered foam cushion onto the seat pan to form an uncompleted lower seat assembly;
placing the uncompleted lower seat assembly into a seat build fixture;
electrically connecting the sensor array to an electrical testing device capable of determining the actuation of the sensors in the sensor array;
determining if the sensors are at a predetermined unloaded output value;
activating the seat build fixture to apply compression force to the uncompleted lower seat assembly;
determining if the sensors have changed output values where the change corresponds to a predetermined amount;
stretching the ends of the seat trim cover around the underside of the seat pan while the seat pan and cushion assembly are in compression;
mounting the ends of the seat trim cover to the bottom of the seat pan in a predetermined manner to form a completed lower seat assembly; and
de-activating the seat build fixture to release compression force from completed lower seat assembly.

12. A method as set forth in claim 11 wherein the step of determining if the sensors are at a predetermined unloaded output value further includes the step of rejecting the uncompleted lower seat assembly if any sensor is not at the predetermined unloaded value.

13. A method as set forth in claim 12 wherein the step of rejecting the uncompleted lower seat assembly if any sensor is not at the predetermined unloaded value further includes the steps of:
removing the uncompleted lower seat assembly from the fixture;
removing the seat cushion from the seat pan;
replacing the sensor array;
reassembling the seat cushion to the seat pan; and
returning the uncompleted lower seat assembly to the seat fixture to be retested.

14. A method as set forth in claim 11 wherein the step of determining if the sensors have changed output values where the change corresponds to a predetermined amount when the seat build fixture is activated further includes the step of rejecting the uncompleted lower seat assembly if any sensor did not change its output value to the predetermined amount.

15. A method as set forth in claim 14 wherein the step of rejecting the uncompleted lower seat assembly if any sensor did not change its output value to the predetermined amount further includes the steps of:
de-activating the seat build fixture to release compression force from the uncompleted lower seat assembly;
removing the uncompleted lower seat assembly from the fixture;
removing the seat cushion from the seat pan;
replacing the sensor array;

reassembling the seat cushion to the seat pan; and
returning the uncompleted lower seat assembly to the seat fixture to be retested.

16. A method as set forth in claim 11 wherein the step of de-activating the seat build fixture to release compression force from completed seat assembly further includes the steps of:
  determining if the sensors have changed output values where the change corresponds to a predetermined amount; and
  rejecting the completed lower seat assembly if any sensor did not change its output value to the predetermined amount.

17. A method as set forth in claim 16 wherein the step of rejecting the completed lower seat assembly if any sensor did not change its output value to the predetermined amount when the seat build fixture is de-activated further includes the steps of:
  re-activating the seat build fixture to apply compression force to the completed lower seat assembly;
  unmounting the seat trim cover from the bottom of the seat pan;
  removing the seat assembly from the fixture;
  removing the seat cushion from the seat pan;
  replacing the sensor array;
  reassembling the seat cushion to the seat pan; and
  returning the seat pan and cushion assembly to the seat fixture to be retested.

* * * * *